US008560095B2

(12) United States Patent
Brindle et al.

(10) Patent No.: US 8,560,095 B2
(45) Date of Patent: Oct. 15, 2013

(54) CHANGEABLE BACNET INTERFACE

(75) Inventors: Ralph Collins Brindle, Edina, MN (US); Dean C. Matsen, Shoreline, WA (US); Michael Andrew Pouchak, Saint Anthony, MN (US)

(73) Assignee: Honeywell International Inc., Morristown, NJ (US)

( * ) Notice: Subject to any disclaimer, the term of this patent is extended or adjusted under 35 U.S.C. 154(b) by 811 days.

(21) Appl. No.: 12/650,513

(22) Filed: Dec. 30, 2009

(65) Prior Publication Data

US 2011/0161844 A1 Jun. 30, 2011

(51) Int. Cl.
*G05B 15/00* (2006.01)
*G06F 3/00* (2006.01)
*G06F 3/048* (2013.01)

(52) U.S. Cl.
USPC .............................. 700/83; 715/762; 715/853

(58) Field of Classification Search
USPC ........ 700/17, 19, 83, 275, 276; 709/220, 223, 709/224; 711/103, E12.008; 715/762, 853
See application file for complete search history.

(56) References Cited

U.S. PATENT DOCUMENTS

| | | | |
|---|---|---|---|
| 6,067,477 A * | 5/2000 | Wewalaarachchi et al. .... | 700/83 |
| 6,477,434 B1 * | 11/2002 | Wewalaarachchi et al. .... | 700/83 |
| 6,487,457 B1 * | 11/2002 | Hull et al. ....................... | 700/17 |
| 6,571,140 B1 * | 5/2003 | Wewalaarachchi et al. .... | 700/83 |
| 6,598,056 B1 * | 7/2003 | Hull et al. ............................. | 1/1 |
| 6,832,120 B1 * | 12/2004 | Frank et al. ...................... | 700/65 |
| 7,349,761 B1 * | 3/2008 | Cruse ............................. | 700/276 |
| 7,693,987 B2 * | 4/2010 | Hong et al. .................... | 709/224 |
| 7,761,563 B2 * | 7/2010 | Shike et al. .................... | 709/224 |
| 7,986,701 B2 * | 7/2011 | Kore et al. ..................... | 370/401 |
| 7,987,247 B2 * | 7/2011 | Westphal et al. .............. | 709/220 |
| 8,174,962 B2 * | 5/2012 | Ramanathan et al. ......... | 370/216 |
| 8,190,275 B2 * | 5/2012 | Chang ............................. | 700/20 |
| 8,214,061 B2 * | 7/2012 | Westrick et al. ................. | 700/9 |
| 8,234,704 B2 * | 7/2012 | Ghai et al. ....................... | 726/16 |
| 2002/0198990 A1 * | 12/2002 | Bradfield et al. ............. | 709/224 |
| 2003/0078677 A1 * | 4/2003 | Hull et al. .......................... | 700/1 |
| 2004/0059814 A1 * | 3/2004 | Komiya et al. ................ | 709/224 |
| 2005/0230490 A1 | 10/2005 | Pouchak et al. | |
| 2007/0233323 A1 * | 10/2007 | Wiemeyer et al. ............ | 700/276 |
| 2007/0273307 A1 * | 11/2007 | Westrick et al. .............. | 315/312 |
| 2008/0004754 A1 | 1/2008 | Pouchak et al. | |
| 2008/0010049 A1 | 1/2008 | Pouchak et al. | |
| 2008/0015739 A1 | 1/2008 | Wacker | |
| 2008/0016493 A1 | 1/2008 | Pouchak et al. | |
| 2008/0115153 A1 | 5/2008 | Brindle | |
| 2008/0125914 A1 | 5/2008 | Wacker | |

(Continued)

OTHER PUBLICATIONS

Honeywell Spyder Bacnet User's Guide, 242 pages, Revised Jul. 2009.

(Continued)

*Primary Examiner* — Charles Kasenge
(74) *Attorney, Agent, or Firm* — Seager Tufte & Wickhem LLC.

(57) ABSTRACT

A changeable BACnet interface system having a workstation and a controller. The system may allow a controller object interface to be engineered and downloaded to the controller via configuration files, rather than as individual objects created at run time. A BACnet network may be connected to the workstation and controller. BACnet objects may be designed to constitute an interface to the control application, and be stored in the controller. The BACnet interface may be presented to the BACnet network.

12 Claims, 5 Drawing Sheets

(56) References Cited

U.S. PATENT DOCUMENTS

| | | | |
|---|---|---|---|
| 2008/0183317 A1* | 7/2008 | Kim et al. | 700/90 |
| 2008/0195254 A1* | 8/2008 | Jung et al. | 700/276 |
| 2008/0195687 A1* | 8/2008 | Jung et al. | 709/201 |
| 2008/0195757 A1* | 8/2008 | Kim et al. | 709/245 |
| 2008/0209506 A1* | 8/2008 | Ghai et al. | 726/1 |
| 2009/0037938 A1* | 2/2009 | Frank | 719/320 |
| 2009/0055765 A1* | 2/2009 | Donaldson et al. | 715/771 |
| 2009/0113037 A1 | 4/2009 | Pouchak | |
| 2009/0271001 A1* | 10/2009 | Westphal et al. | 700/3 |
| 2009/0287736 A1* | 11/2009 | Shike et al. | 707/103 R |
| 2010/0100583 A1 | 4/2010 | Pouchak | |

OTHER PUBLICATIONS

Honeywell Spyder User's Guide 202 pages, Released Jul. 2007.
Siemens, BACnet for DESIGO 27 pages, prior to Dec. 30, 2009.

* cited by examiner

CHANGEABLE BACNET INTERFACE

RELATED APPLICATIONS

Related co-pending applications include application Ser. No. 12/650,385, filed Dec. 30, 2009, entitled "A Graphical Approach to Setup Data Sharing between Two Controllers"; application Ser. No. 12/650,447, filed Dec. 30, 2009, entitled "A Mechanism for Constructing Generic Control Logic including Versions in Various Protocols"; application Ser. No. 12/650,467, filed Dec. 30, 2009, entitled "Protocol Independent Programming Environment"; application Ser. No. 12/650,467, filed Dec. 30, 2009, entitled "Priority Selection Mechanism for Driving Outputs from Control Logic for Controllers of Various Protocols"; application Ser. No. 12/650, 485, filed Dec. 30, 2009, entitled "An Approach to Automatically Encode Application Enumeration Values to Enable Reuse of Applications across Various Controllers"; and application Ser. No. 12/650,497, filed Dec. 30, 2009, entitled "An Approach for Switching between Point Types without Affecting Control Logic".

application Ser. No. 12/650,385, filed Dec. 30, 2009, entitled "A Graphical Approach to Setup Data Sharing between Two Controllers", is hereby incorporated by reference. application Ser. No. 12/650,447, filed Dec. 30, 2009, entitled "A Mechanism for Constructing Generic Control Logic including Versions in Various Protocols", is hereby incorporated by reference. application Ser. No. 12/650,467, filed Dec. 30, 2009, entitled "Protocol Independent Programming Environment", is hereby incorporated by reference. application Ser. No. 12/650,476, filed Dec. 30, 2009, entitled "Priority Selection Mechanism for Driving Outputs from Control Logic for Controllers of Various Protocols", is hereby incorporated by reference. application Ser. No. 12/650,485, filed Dec. 30, 2009, entitled "An Approach to Automatically Encode Application Enumeration Values to Enable Reuse of Applications across Various Controllers", is hereby incorporated by reference. application Ser. No. 12/650,497, filed Dec. 30, 2009, entitled "An Approach for Switching between Point Types without Affecting Control Logic", is hereby incorporated by reference.

U.S. patent application Ser. No. 12/256,444, filed Oct. 22, 2008, is hereby incorporated by reference. U.S. patent application Ser. No. 11/670,911, filed Feb. 2, 2007, is hereby incorporated by reference. U.S. patent application Ser. No. 11/620,431, filed Jan. 5, 2007, is hereby incorporated by reference. U.S. patent application Ser. No. 11/427,750, filed Jun. 29, 2006, is hereby incorporated by reference. U.S. patent application Ser. No. 11/564,797, filed Nov. 29, 2006, is hereby incorporated by reference. U.S. patent application Ser. No. 11/559,706, filed Nov. 14, 2006, is hereby incorporated by reference. U.S. patent application Ser. No. 10/809,115, filed Mar. 25, 2004, is hereby incorporated by reference. U.S. patent application Ser. No. 11/777,873, filed Jul. 13, 2007, is hereby incorporated by reference. U.S. patent application Ser. No. 11/923,471, filed Oct. 24, 2007, is hereby incorporated by reference. U.S. patent application Ser. No. 12/435,993, filed May 5, 2009, is hereby incorporated by reference.

BACKGROUND

The invention pertains to controllers and particularly to communications between controllers.

SUMMARY

The invention is a changeable BACnet interface system having a workstation and a controller. The system may allow a controller object interface to be engineered and downloaded to the controller via configuration files, rather than as individual objects created at run time. A BACnet network may be connected to the workstation and controller. BACnet objects may be designed to constitute an interface to the control application, and be stored in the controller. The BACnet interface may be presented to the BACnet network.

DESCRIPTION

Existing BACnet controllers may implement a capability to change a set of BACnet (building automation and control network) objects supported by the controller. But these controllers do so by allowing the objects to be created at run-time. A product implementation to support run-time object creation is regarded as resource intensive, and so requires an expensive controller.

The present invention may allow a controller object interface to be engineered and downloaded to the controller via configuration files, rather than as individual objects created at run time. The controller need not support the run-time creation of objects, so such approach can be less expensive.

One approach may involve a set of objects defined by a downloadable configuration file. The controller may support BACnet AtomicReadFile (atomic read file) and AtomicWriteFile (atomic write file) services to transfer the configuration file between an engineering tool (e.g., workstation) and the controller. The controller does not necessarily need to support the services that would be required for run-time object creation.

A downloadable configuration file may specify a list of objects to be supported. For each object, the configuration file may specify an object type, an object identifier (instance number), and supported properties associated with the object. Property specifications may vary with the object type, but typically may incorporate a data type of the property and note whether the property is writable or read only. For read only properties, a fixed value may be specified. For writable properties, a value storage location may be specified. Storage locations may be specified to be volatile (i.e., lost on power outage) or nonvolatile (i.e., retained through power outages). After the controller receives a configuration file from the engineering tool, the controller may restart with support in place for a newly engineered set of objects.

Figure 1:
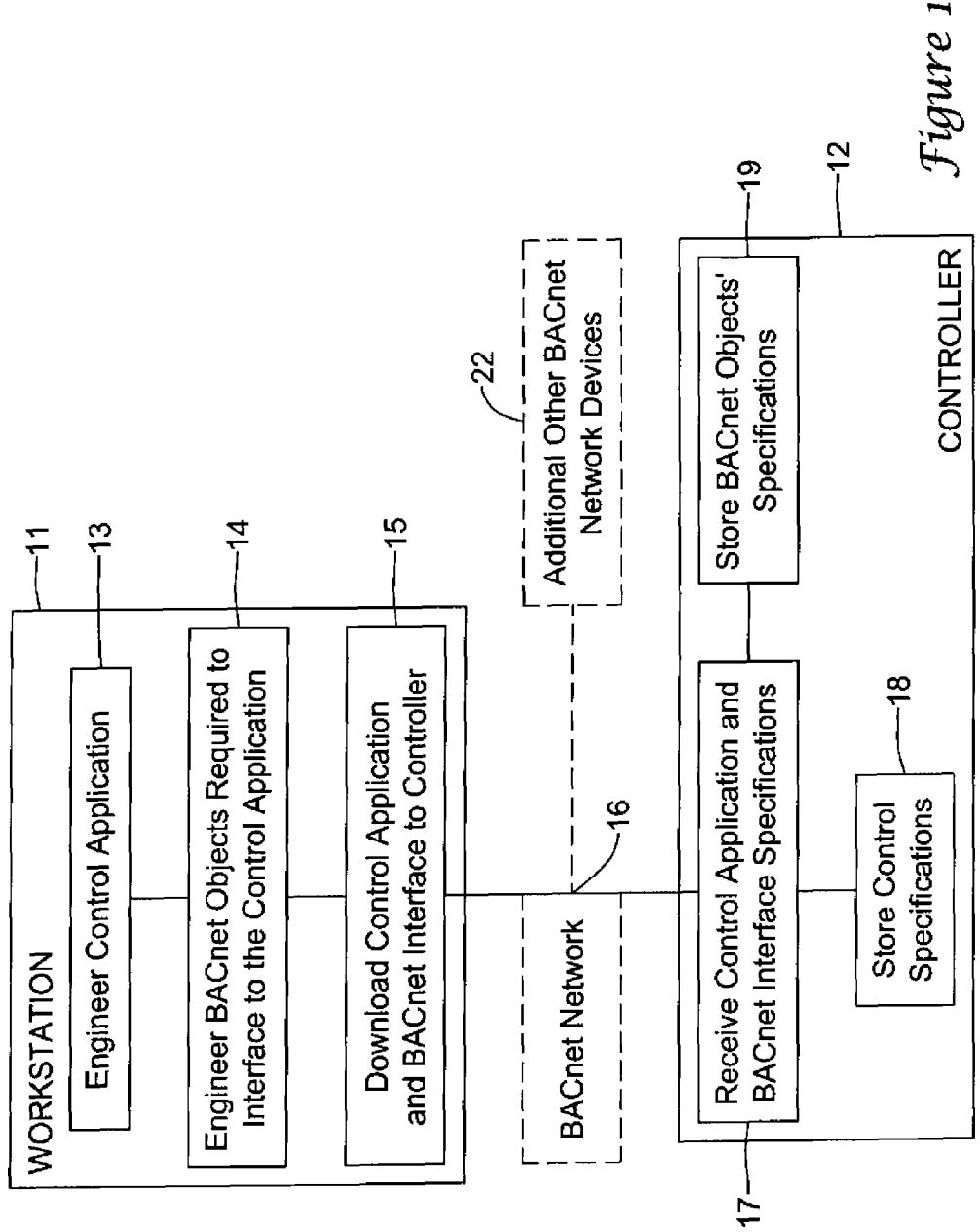
FIGS. 1 and 2 are diagrams of an approach for making a BACnet interface.

FIG. 1 is a diagram showing a BACnet interface creation approach. A PC workstation 11 may be connected to a controller 12 via a BACnet network 16. Network 16 may be connected to additional other BACnet network devices 22. At workstation 11, a control application may be engineered as indicated by symbol 13. One may use a programmable controller worksheet with function blocks on the workstation 11. Then at symbol 14, BACnet objects required to interface to the control application may be engineered. One may specify network objects and connections as needed from the control application. The control application and BACnet interface may be downloaded to controller 12 from symbol 15. The download from the workstation 11 to the controller may occur via a BACnet file service via BACnet network 16. The control application and BACnet interface specifications may be received as a download at symbol 17 in controller 12. From symbol 17, control specifications may be stored at symbol 18. Also from symbol 17, BACnet object specifications may be stored at symbol 19. Symbols 17 and 19 may contain flash memories, or other types of memories.

Figure 2:
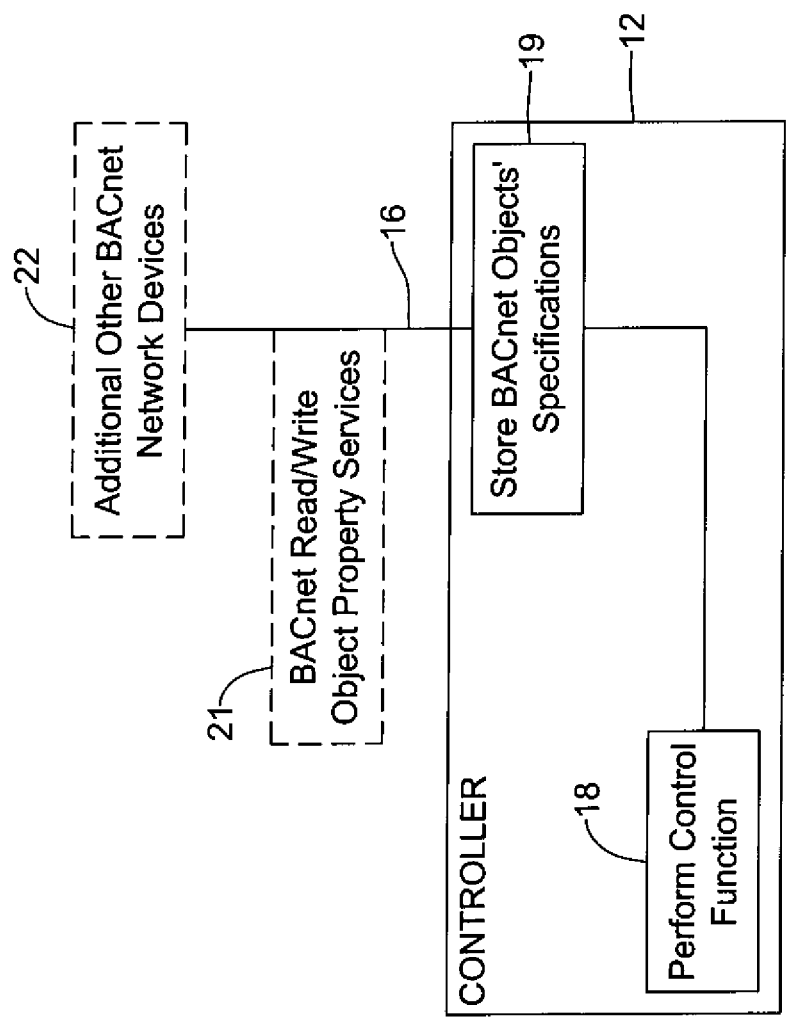

In FIG. 2, the control function may be performed using the control specifications at symbol 18. Control function information may be provided from symbol 18 to symbol 19 via a linkage. From symbol 19, the BACnet objects may be presented to other BACnet devices 22 via BACnet network 16. Access to the BACnet interface objects may be provided via BACnet read/write object property services 21.

Figure 3:
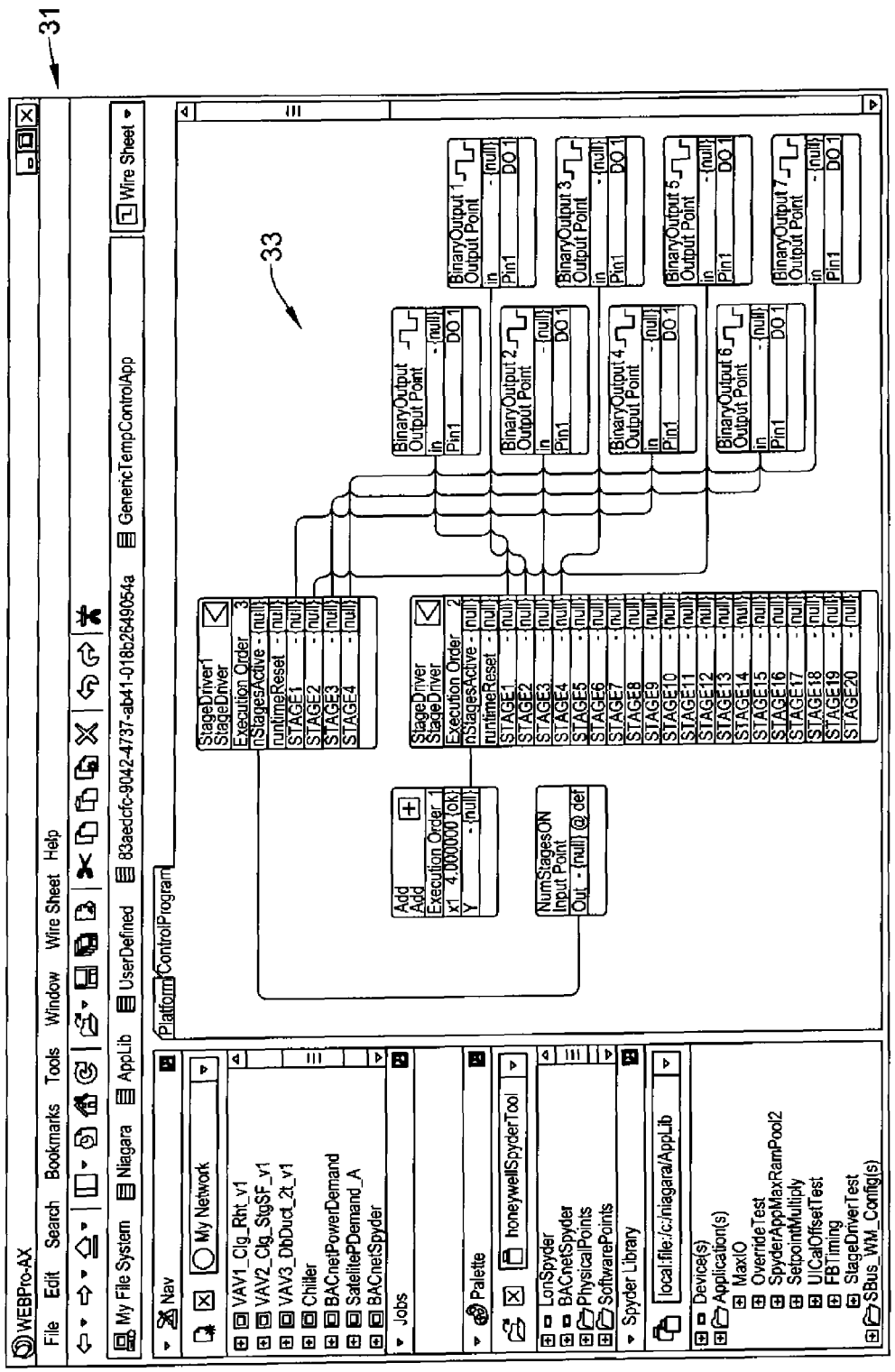
FIG. 3 is a diagram screenshot of an example function block diagram for engineering a control application.
Figure 4:
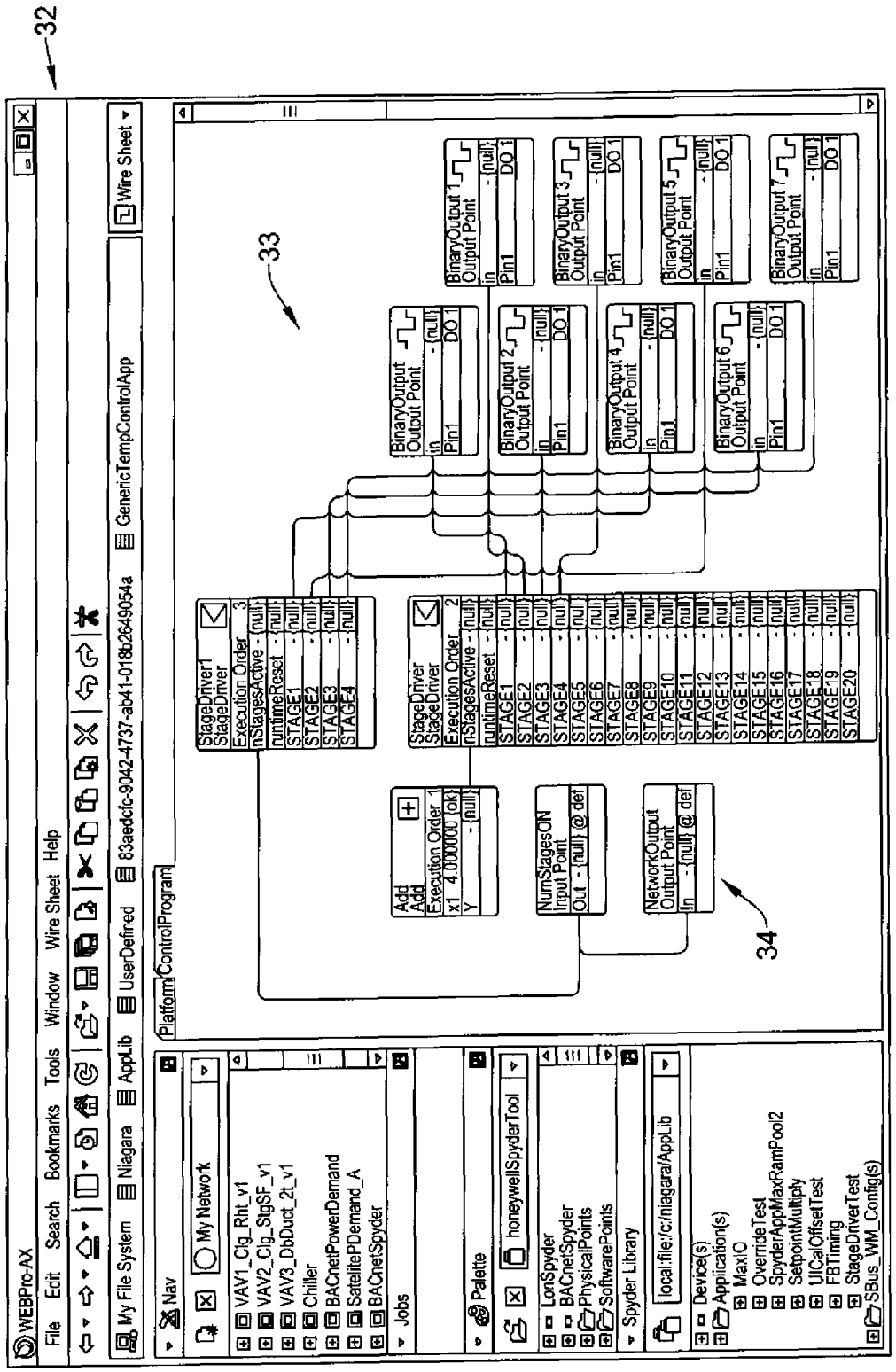
FIG. 4 is the diagram of FIG. 3 but with a BACnet interface added.

FIG. 3 is a screenshot 31 of an example function block diagram or wiresheet 33 at the engineer control application 13. FIG. 4 is a screenshot 32 of the wiresheet 33 with a BACnet interface (set of BACnet objects) 34 added.

In the heating, ventilation and air conditioning (HVAC) industry, BACnet controllers may require a large overhead of data objects such as analog inputs, analog outputs, file objects, and event enrollment objects. Current B-ASC (application specific controller) classification devices may include an ability to read and write properties of its own BACnet objects, and the B-AAC (advanced application controller) classification may include additional features such as data sharing, alarm and event management, scheduling, and device and network management. An implementation of BACnet controllers on the market may require an implementation of processor-intensive resources such as memory and run-time objects to implement BACnet control objects and may require extensive overhead and code space to implement the objects.

The present approach may allow the BACnet configuration files to be generated in a system that is integrated with configuration files developed in conjunction with a graphical compiler tool (see U.S. patent application Ser. No. 11/777,873, filed Jul. 13, 2007). High level attributes may be handed off from graphical compiler tools and create BACnet configuration files that contain the essence of the BACnet object behavior, along with interfaces to underlying implementation mechanics for communication, hardware setup and configuration. By creation of the BACnet files in a predefined efficient format, additional resources and configuration burden may be moved from the run-time environment to a designer engineering tool. The end result may be a much less costly implementation which can do the same control functionality as a more expensive standard BACnet object approach.

The system may be composed of a graphical compiler tool, a function block engine, and an underlying implementation of the configuration information. A file transfer mechanism may download the files to controller storage areas from the graphical compiler tool. As the user defines and creates a control system, individual graphical interface blocks such as network points (objects) AV (analog value), BV (binary value) and MV (multi state value), and physical points (objects) AI (analog input), AO (analog output) and BO (binary output) may be dragged on the screen and connected to control blocks. Each of these objects may have certain properties. Some of the properties may be mandatory and some may be optional.

Figure 5:
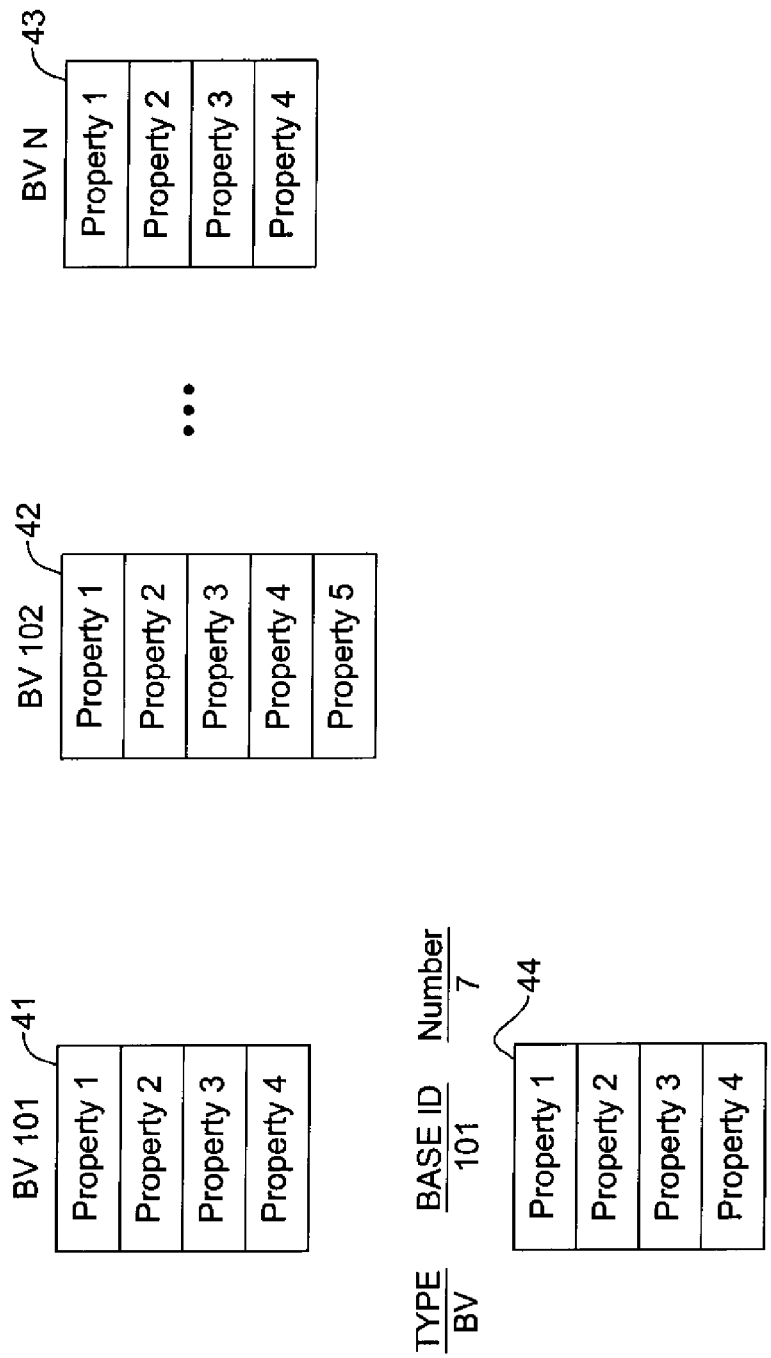
FIG. 5 is a diagram of formats for storing BACnet objects.

BACnet objects may be saved in a memory in a conventional manner as shown by items 41, 42 and 43 (see FIG. 5). Item 41 may be a format for saving an object BV 101. Item 42 may be a format for saving an object BV 102. A sequence of objects up to BV N may be used for saving a sequence of objects. The last object of the sequence may be saved in a format of item 43. However, some or all of the objects with their properties may be saved in a format of one item 44. If an object has one or more additional, exceptional or optional properties, such as BV 102, the properties may be in a format of item 45. However, the other properties of BV 102 may be listed in item 44. Having merely items 44 and 45 to save the objects in items 41, 42 and so on to BV N in item 43, would save much memory. The memory used may be a flash memory, RAM or other kinds of memory. Using flash memory would aid in saving memory and money relative to storage of the objects.

The graphical compiler tool may generate individual configuration objects at compile time and may create several BACnet configuration files that are used to configure the BACnet interface. Individual storage locations and configurations for physical and logical network values may be created, and individual memory indices may be generated and assigned by the graphical compiler tool. After downloading to the controller, an additional initialization may result in an efficient implementation of the BACnet system design.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A designed BACnet interface system, comprising:
a workstation; and
a controller connected to the workstation; and
wherein:
the workstation comprises a mechanism for designing a control application and specifying objects for a BACnet interface to the control application;
the control application and the BACnet interface are downloaded to the controller, wherein the BACnet interface includes a configuration file specifying a list of one or more objects, one or more properties associated with the one or more objects, and an interface to one or more underlying implementation mechanics; and
the control application and the BACnet interface are stored in a flash memory of the controller, wherein BACnet objects are saved in the memory in a first format for saving two or more objects having common properties and the BACnet objects are saved in a second format as needed for saving uncommon properties of the two or more objects saved in the first format.

2. The interface system of claim 1, wherein the controller is connected to the workstation via a BACnet network.

3. The interface system of claim 2, wherein the controller further comprises performing a control function on a control specification.

4. The interface system claim 3, wherein the controller further comprises providing BACnet objects of a designed interface to a BACnet network.

5. The interface system of claim 4, wherein the BACnet network is for providing BACnet read-write object property services.

6. The interface system of claim 4, wherein the memory is a flash memory.

7. The interface system of claim 1, wherein the BACnet objects are saved in the memory in a format for saving two or more objects having common properties.

8. A method for designing a BACnet interface, comprising:
providing a workstation;
providing a controller connected to the workstation via a BACnet network, the controller configured for:
  performing a control function using one or more control specifications; and
  providing, by the controller, access to BACnet objects of a designed interface to a network via a BACnet network; and
engineering a control application;
specifying objects for a BACnet interface to the control application;
creating the BACnet interface, the BACnet interface having at least one configuration file including a list of the specified objects, one or more properties of the specified objects, and at least one interface to underlying implementation mechanics for communication and/or hardware setup;
downloading the control application and the BACnet interface to the controller; and
storing the control application and the BACnet interface in a flash memory, wherein BACnet objects are saved in the memory in a first format for saving two or more objects having common properties and the BACnet objects are saved in a second format as needed for saving uncommon properties of the two or more objects saved in the first format.

9. The method of claim 8, wherein the network is for providing BACnet read-write object property services.

10. The method of claim 8, wherein the BACnet objects are saved in the memory in a format for saving two or more objects having common properties.

11. A system having a designable BACnet interface, comprising:
a workstation; and
a controller connected to the workstation, the controller configured for performing a control function on the one or more control specifications and for providing BACnet objects of a changed interface to a network via a BACnet network, wherein the network is for providing BACnet read-write object property services; and
wherein:
the workstation comprises:
a function block wiresheet; and
a graphical compiler connected to the wiresheet;
the workstation provides a control application and specifies objects for a BACnet interface to the control application;
the control application and the BACnet interface are downloaded to the controller and stored in a memory, wherein BACnet objects are saved in the memory in a first format for saving two or more objects having common properties and the BACnet objects are saved in a second format as needed for saving uncommon properties of the two or more objects saved in the first format; and
the controller is connected to the workstation via a BACnet network.

12. A system having a designable BACnet interface, comprising:
a workstation; and
a controller connected to the workstation, the controller configured for performing a control function on the one or more control specifications and for providing BACnet objects of a changed interface to a network via a BACnet network, wherein the network is for providing BACnet read-write object property services; and
wherein:
the workstation comprises:
a function block wiresheet; and
a graphical compiler connected to the wiresheet;
the workstation provides a control application and specifies objects for a BACnet interface to the control application;
the control application and the BACnet interface are downloaded to the controller and stored in a flash memory, wherein BACnet objects are saved in the memory in a first format for saving two or more objects having common properties and the BACnet objects are saved in a second format as needed for saving uncommon properties of the two or more objects saved in the first format; and
the controller is connected to the workstation via a BACnet network.

* * * * *